(12) United States Patent
Dominke et al.

(10) Patent No.: US 6,302,501 B1
(45) Date of Patent: Oct. 16, 2001

(54) METHOD AND APPARATUS FOR CONTROLLING THE BRAKE SYSTEM OF A VEHICLE

(75) Inventors: Peter Dominke, Bietigheim-Bissinger; Ulrich Gottwick, Stuttgart, both of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 08/718,539

(22) PCT Filed: Feb. 28, 1996

(86) PCT No.: PCT/DE96/00327

§ 371 Date: Sep. 30, 1996

§ 102(e) Date: Sep. 30, 1996

(87) PCT Pub. No.: WO96/30240

PCT Pub. Date: Oct. 3, 1996

(30) Foreign Application Priority Data

Mar. 27, 1995 (DE) ............................................. 195 11 152

(51) Int. Cl.⁷ ...................................................... B60T 8/34
(52) U.S. Cl. ......................................... 303/186; 303/113.5
(58) Field of Search ................................... 303/186, 113.5

(56) References Cited

U.S. PATENT DOCUMENTS

| | | | |
|---|---|---|---|
| 4,850,650 | * | 7/1989 | Eckert et al. .......................... 303/186 |
| 5,219,210 | * | 6/1993 | Maehara ................................ 303/186 |
| 5,281,012 | | 1/1994 | Binder et al. ...................... 303/113.5 |
| 5,284,385 | | 2/1994 | Müller et al. ...................... 303/113.5 |
| 5,632,535 | * | 5/1997 | Luckevich et al. .................. 303/186 |

FOREIGN PATENT DOCUMENTS

| | | |
|---|---|---|
| 4208581 | 5/1993 | (DE) . |
| 4226646 | 2/1994 | (DE) . |
| 2539687 | 7/1984 | (FR) . |

* cited by examiner

Primary Examiner—Matthew C. Graham
(74) Attorney, Agent, or Firm—Fulbright & Jaworski, LLP

(57) ABSTRACT

A method for distributing the braking force between the front and rear axles, pressure is built up and released alternately at the rear axle brakes, so that, on average, a saturation pressure is reached which is below the primary pressure specified by the driver. This method is suitable especially for brake systems without pressure reducers for the rear wheel brakes, when, in the absence of input information, the electronic distribution of the braking force is no longer possible.

13 Claims, 4 Drawing Sheets

METHOD AND APPARATUS FOR CONTROLLING THE BRAKE SYSTEM OF A VEHICLE

STATE OF THE ART

The invention pertains to a method and to an apparatus for controlling the brake system of a vehicle wherein a control unit builds up and release pressure at least at the rear wheel brakes.

A brake pressure control system for a vehicle is known from DE 41 12 388 A1 (U.S. Pat. No. 5,281,012), in which, in addition to an antilock control, the braking force distribution between the front and rear axle brakes is adjusted electronically. The pressure reducer normally used is replaced by the known electronic control of the braking force distribution. If this controller fails for some reason, the rear wheels can lock before the front wheels in certain braking situations as a result of the overbraking of the rear axle. This can lead to undesirable driving situations.

SUMMARY OF THE INVENTION

It is therefore the task of the present invention to provide for the failure-proof braking force distribution between the front and rear axles without hydraulic or pneumatic pressure reducers. This failure-proof braking force distribution should preferably serve to distribute the braking forces on an emergency basis after the failure of the electronic controller.

This is achieved by the alternating buildup and release of pressure at the rear wheel brakes, until a saturation pressure value is reached, which is below the primary pressure specified by the driver.

It is known from the publication SAE 89078 "Electronic Control Unit of the Sumitomo Electronic Anti-Lock System" that it is possible to check the working order of the electronic control unit and of the components of a brake system of a motor vehicle.

The method according to the invention ensures that the rear wheels do not lock before the front wheels even in cases where no electronic controller for the braking force distribution is present. The method according to the invention therefore offers particular advantages in cases where the electronic braking force distribution controller has failed.

This has the advantage that, even in the presence of a defect, the stability of the vehicle remains preserved during the braking process. It is possible to eliminate the supplemental pressure reducers provided for emergency situations.

It is especially advantageous that the method for distributing the braking forces according to the invention makes it possible to control the braking force distribution between the front and rear axles without any additional information.

The method according to the invention offers particular advantages when the so-called "double defect" case occurs, when, for example, all of the speed sensors of one axle fail.

The method according to the invention can also be used advantageously in cases not characterized by a defect.

It is especially advantageous that the pressure being reached at the rear axle is adjusted independently of the primary pressure specified by the driver through his actuation of the brake pedal.

In an exemplary embodiment, the dependence of the adjustment of the rear axle brake pressure as a function of the voltage of the vehicle's electrical system, of the primary pressure, or of the brake pressure level already present at the rear axle brakes is especially advantageous.

A further advantageous increase in the availability of the brake system is achieved in that the strategy according to the invention for distributing the braking force is calculated not in to the main computer, which implements the electronic control, but rather in a separate component, which works independently of the main computer element.

Another advantage is achieved by limiting the time during which the method according to the invention is applied. As a result, the components are protected from thermal overloads during prolonged periods of braking. Here it is advantageous that the pressure level in the rear wheel brakes is raised in accordance with a predetermined "ramp" to the primary pressure level after the expiration of a specified time.

DESCRIPTION OF EXEMPLARY EMBODIMENTS

Figure 1:
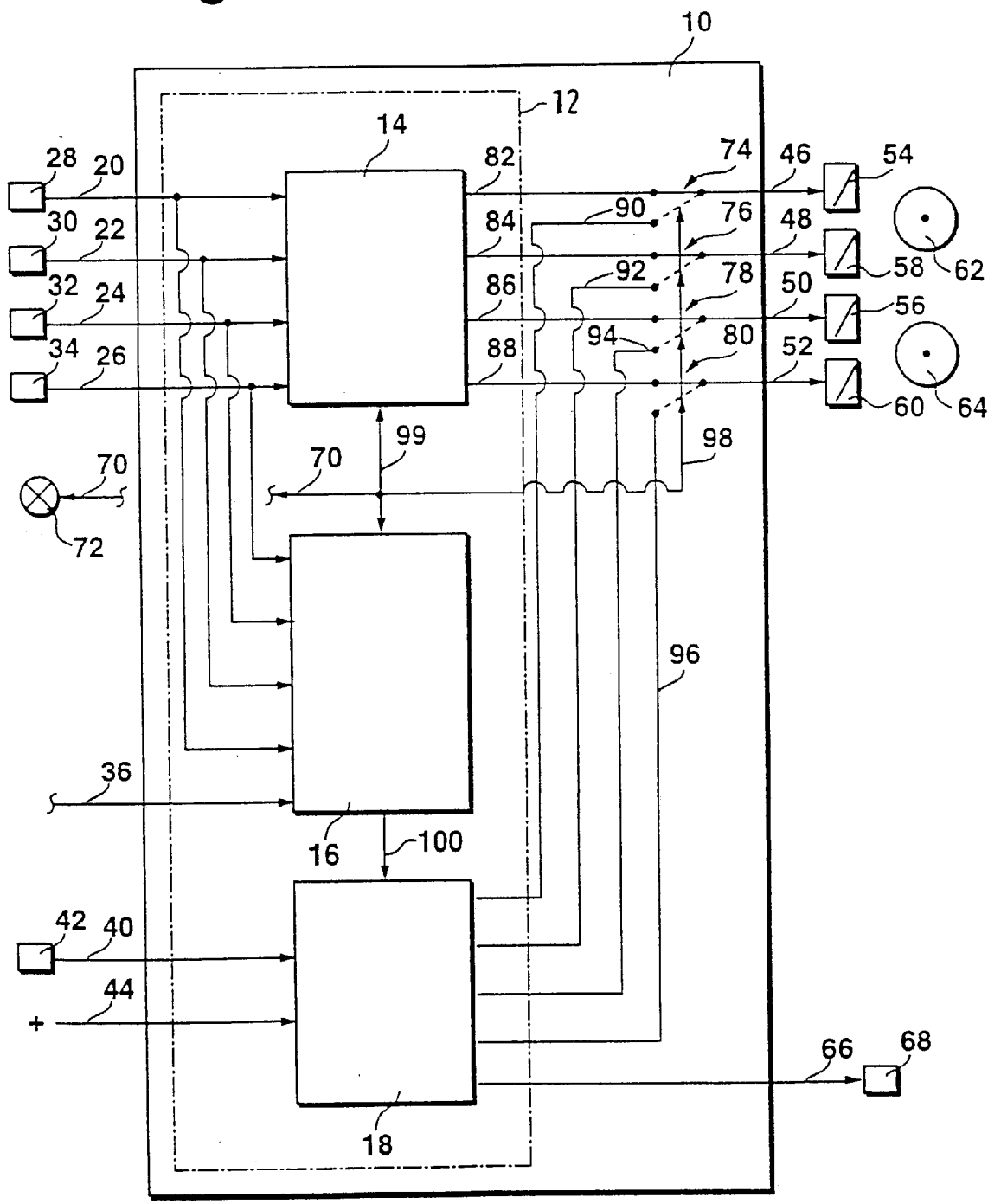
FIG. 1 shows an overall block circuit diagram, in which the method according to the invention is used.

FIG. 1 shows a control unit 10, which comprises at least one microcomputer 12. In the preferred exemplary embodiment, microcomputer 12 contains a controller unit 14, a defect detection unit 16, and an emergency unit 18. Speed sensors 28, 30, 32, 34 for the wheels of a two-axle vehicle are connected via lines 20, 22, 24, 26 to control unit 10, i.e., to microcomputer 12. In the preferred exemplary embodiment, lines 20, 22, 24, 26 are connected to controller unit 14 and to defect detection unit 16. In addition, an input line 36 is shown by way of example, which supplies defect detection unit 16 of control unit 10, i.e., of microcomputer 12, with operating parameters of the brake valves, the return pump, etc. An input line 40, furthermore, is also shown leading to control unit 10; this line connects the control unit with a brake pedal switch 42. In the preferred exemplary embodiment, line 40 is connected at least to emergency operating unit 18. In addition, an input line 44 of control unit 10 is shown, which supplies emergency operating unit 18 with a measure of the voltage of the vehicle's electrical system. In addition to the input lines shown, other input lines, not shown, can also be provided to supply values for the brake pressures, especially those of the rear wheel brakes, values for the engine torque being generated, etc.

In FIG. 1, lines 46, 48, 50, 52 are shown as output lines, which lead to inlet valves 54, 56 and to outlet valves 58, 60 of the brakes of the two rear wheels 62, 64. In addition, an output to line 66 for actuating return pump 68 is provided. Output line 66 proceeds at least from emergency operating unit 18 and (not shown in FIG. 1) from controller unit 14. Another output line 70 leads from defect detection unit 16 of control unit 10 to a warning lamp 72. Switching elements 74, 76, 78, 80 connect output lines 46–52 to output lines 82, 84, 86, 88 of controller unit 14; in their other switching state, the connect output lines 46–52 to output lines 90, 92, 94, 96 of emergency operating unit 18. The switching elements are actuated over a line 98, which proceeds from defect detection unit 16. Defect detection unit 16 is also connected by a line 99 to controller unit 14 and by a line 100 to emergency operating unit 18.

The hydraulic part of the brake system with inlet and outlet valves, reservoirs, and return pump corresponds in the preferred exemplary embodiment to the state of the art cited above.

In addition to the preferred exemplary embodiment shown in FIG. 1, it is provided in another advantageous exemplary embodiment that emergency operating unit 18 is not designed as part of microcomputer 12 but rather as a separate component, such as a separate microcomputer.

In addition, the method according to the invention is applied not only to vehicles with two axles but also to vehicles with more than two. The number of input and output lines is increased correspondingly.

In an advantageous exemplary embodiment, furthermore, unit 18 for controlling the braking force distribution is used not only in emergency situations to distribute the braking force but also under normal operating conditions. In this case, it is possible to eliminate the switching elements and to actuate the valves of the rear axle brakes directly from unit 18.

Under normal operating conditions, controller unit 14 in the preferred exemplary embodiment implements at least an antilock control function and a braking force distribution control function according to the state of the art cited above. For the braking force distribution control, the difference between the fastest front wheel and the slowest rear wheel is calculated and compared with a predetermined threshold value. When the threshold value is exceeded by the difference between the fastest front wheel and the slowest rear wheel, the pressure in the rear wheel brakes is kept constant, so that the predetermined difference is not exceeded. Defect detection unit 16 determines defect states in the area of control unit 10, especially in microcomputer 12, wheel speed sensors 28–34, valves 54–60, return pump 68, etc. When a defect state is identified, defect detection unit 16 actuates warning lamp 72 to inform the driver. In addition, it switches controller unit 14 off and turns emergency operating unit 18 on via line 100, at least when a double defect has occurred in the area of the wheel speed sensors, for example, i.e., when both front wheel or both rear wheel speed sensors are defective. Under the same operating conditions, furthermore, defect detection unit 16 also switches switching elements 74–80 to their opposite state via line 98, so that controller unit 14 no longer actuates rear wheel brake valves 54–60.

When the driver actuates the brake pedal in this operating situation, emergency operating unit 18 activates return pump 68 via line 66 as long as the brake pedal switch signal is present to empty the intermediate storage chamber, into which the pressure medium flows as pressure is being released from the brakes. In addition, the method according to the invention for distributing the braking force between the front and rear axles is activated. This consists in that, when the brakes are actuated, the inlet and outlet valves of the rear wheel brakes are actuated alternately in such a way that, on average, the pressure at the rear wheels is lower than the braking pressure specified by the driver through actuation of the brake pedal. This has the effect of reducing the danger that the rear wheels will lock. The inlet and outlet valves of the rear wheel brakes are actuated with predetermined opening and closing times, which causes the brake pressure actually reached to be, on average, below the primary pressure specified by the driver. Pressure hold phases are also provided. In situations of sufficient output of the return pump and sufficient pulse pause ratio between the pressure buildup and pressure release pulses, the pressure decreases by flowing into the empty storage chamber. The continuous series of pressure buildup and pressure release pulses represents a simulation of a pressure reducer. As a result of the different pressure buildup and release gradients, which are dependent on the wheel pressures, the brake pressures reached in the rear wheel brakes are, on average, lower that the pressure specified by the driver.

In a preferred exemplary embodiment, the alternating actuation of the valves is initiated when a defect is detected by defect detection unit 16. In other advantageous exemplary embodiments, this process takes place only when all of the speed sensors of one axle fail, for example, and the braking force distribution control known from the state of the art can no longer be implemented. In another advantageous exemplary embodiment, the braking force is distributed by the alternating actuation of the valves during all phases of operation.

Figure 2A:
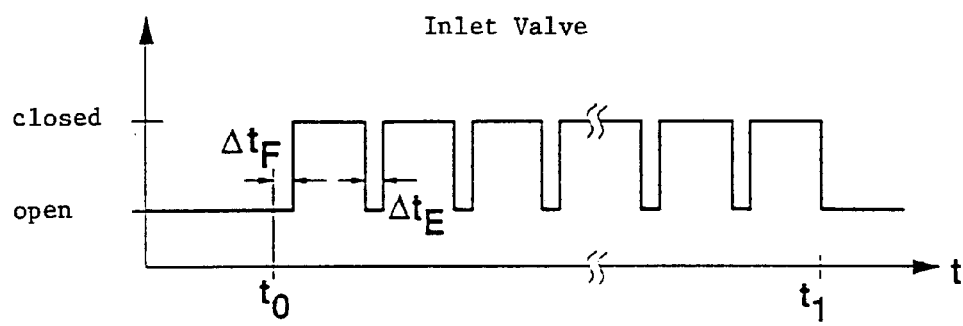
FIGS. 2a, 2b, and 2c are time graphs pertaining to the actuation of the inlet valve, the outlet valve, and the return pump.
Figure 2B:
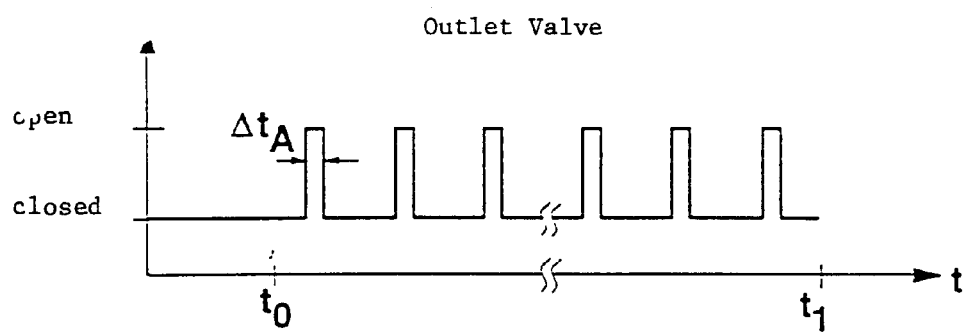
Figure 2C:
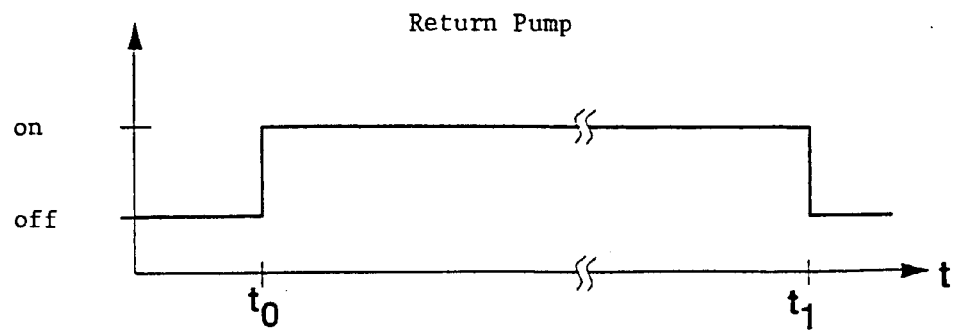

FIG. 2 shows how, on the basis of time graphs, the inlet and outlet valves are actuated alternately according to the invention. FIG. 2a shows the actuation of the inlet valves, and FIG. 2b shows the actuation of the outlet valves. FIG. 2c describes the actuation of the return pump. At time $t_0$, the driver actuates the brake pedal, thus initiating a braking process. In a preferred embodiment of the invention, a filling pulse $\Delta t_F$ of predetermined duration is transmitted to the inlet valves first to improve the dynamics of the pressure buildup. These valves remain open for time $\Delta t_F$ after the actuation of the brakes, so that pressure is built up in the wheel brakes as a function of the driver's actuation of the pedal. In this way, the saturation pressure is reached more quickly. Next, the inlet valve is closed, and then it is opened again for a predetermined time $\Delta t_E$. While the inlet valve remains closed, the outlet valve is opened for a certain time $\Delta t_A$ (see FIG. 2b).

At time $t_1$, the braking process is over. The actuation of the inlet valves is ended; the inlet valve is thus kept open. The actuation of the outlet valve is also ended, and the valve is kept closed. At time $t_1 1$ furthermore, the return pump is turned off.

Times $t_0$ and $t_0$ are recognized by control unit 10 by the switching of brake pedal switch 42, the switching state of which is read via input line 40. t, can also be activated by a time element.

Durations $\Delta t_E$ and $\Delta t_A$ are predetermined and are found experimentally for each brake system. The crucial point in the determination of the pulse durations is the achievable saturation pressure, which must be below the primary pressure specified by the driver so as to limit the pressure at the rear axle.

Figure 3A:
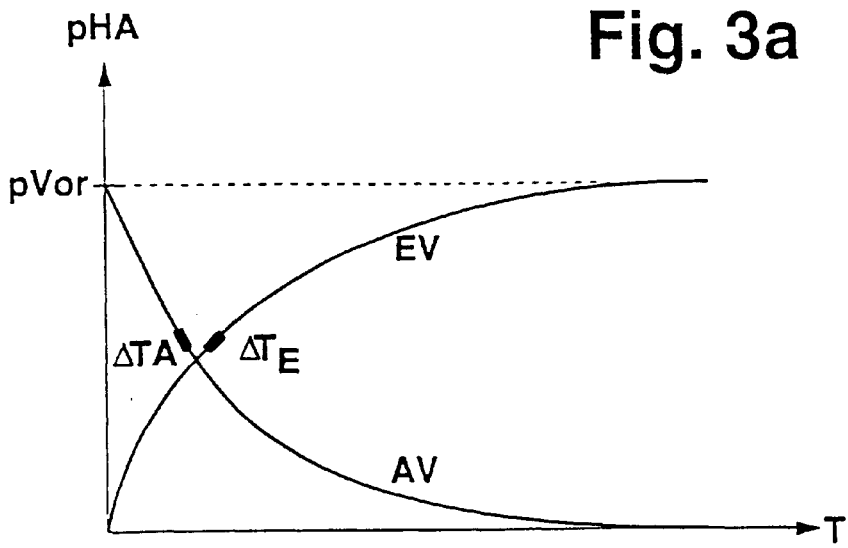
FIG. 3a shows the change in pressure over time at an open inlet value (EV) and at an open outlet valve (AV)
Figure 3B:
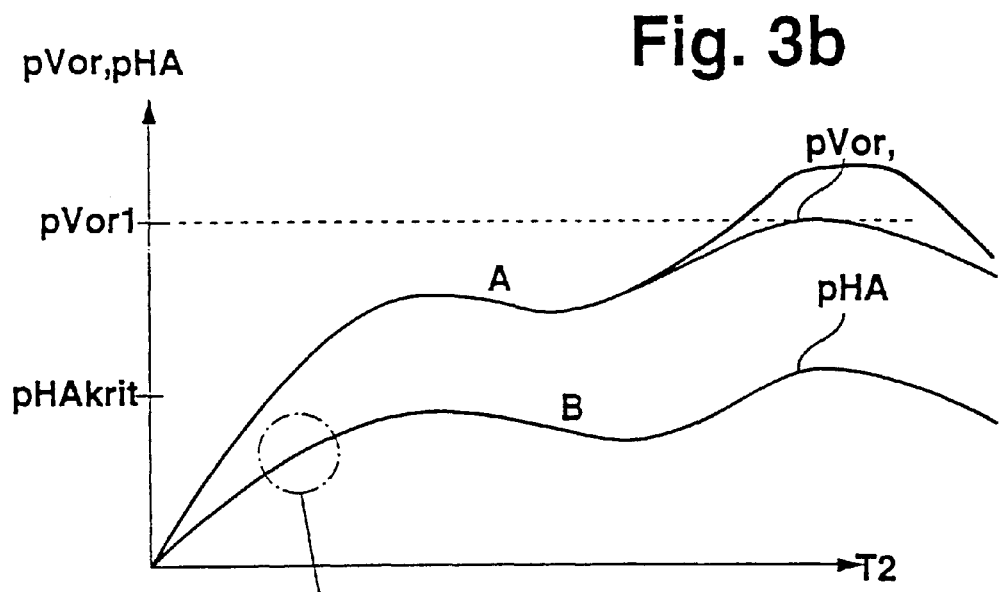
FIG. 3b shows the change in pressure over time as specified by the driver and at the rear wheel brakes.
Figure 3C:
FIG. 3c is an enlarged view of the change in pressure over time at the rear wheel brakes.

FIG. 3a shows the change in pressure over time at an open inlet valve (EV) and at an open outlet valve (AV). FIG. 3b shows the change in pressure at the rear axle brakes as a function of time during a braking process under the control of the method according to the invention. FIG. 3c shows, on an enlarged scale, the buildup and release of pressure as a result of the alternating actuation of the valves.

After the driver specifies a primary pressure $P_{Vor}$ and the valves are being actuated alternately, the pressure is built up and released at the valves as a function of the time as shown in FIG. 3a. The pressure being built up in the rear axle brakes increases quickly at first when the inlet valves are opened. Because, at the beginning, no pressure has been built up in the brake, the brake pressure decreases only slightly at first when the outlet valve is opened. Over the course of time, the build-up of pressure decreases and the release of pressure increases. A saturation value is reached when the amount of pressure built up in time Δt. is the same as the amount of pressure released in time $\Delta t_A$ (see FIG. 3a).

The curve of the average pressure in the rear axle brakes over the course of time during a brake actuation is shown in FIG. 3b.

The primary pressure Pvor is specified by the driver. Under the assumption that the duration of the pulses has been determined correctly, the rear axle pressure $PHA_{krit}$ critical to driving stability is not exceeded (see curve B). If the primary pressure is changed by the driver to a larger value (see curve A), then a new average saturation value is reached.

The actual pressure curve resulting from the build-up and release pulses is shown in FIG. 3c for a segment of curve B in FIG. 3b.

By suitable adjustment of the pulse-pause times or pulse-pause lengths $\Delta t_E$ and $\Delta t_A$, the saturation pressure which can be reached in the rear wheel brakes is limited in such a way that, up to a primary pressure $p_{vor1}$, the pressure in the rear wheel brakes does not exceed the critical value and thus the rear wheels do not lock. The primary pressure $P_{Vor1}$ is the pressure at which the front wheels lock on surfaces with an adhesion coefficient of approximately 0.8. If the driver prescribes a higher primary pressure, the front wheels will lock on these surfaces, so that, with a view to the stability of the vehicle, there is no longer any need to prevent the rear wheels from locking (see time $t_2$ in FIG. 3b). Another improvement in the braking force distribution is achieved in that the pulse times vary as a function of the voltage of the vehicle's electrical system and/or of the primary pressure. For this purpose, the pulse times are filed in a table as a function of the voltage and/or of the primary pressure and are read out again in correspondence with the brake actuation. The primary pressure is detected by a pedal distance sensor and/or by a pressure sensor for determining the brake command.

A further improvement in the braking force distribution is achieved by selecting the pulse durations as a function of whether the rear wheel brake pressure has already reached the saturation value or is still in the approach phase. This can be estimated from the pressure buildup and pressure release times or by counting the pulses. In principle, a longer pulse length will be selected when it is desired to reach the saturation pressure more quickly during the approach phase, whereas shorter pulse durations are sufficient when the pressure is near the saturation value.

The method of alternating actuation of inlet and outlet valves according to the invention is suitable especially for emergency operation after several critical defects have been detected. This is especially true in the case of defects which mean that reliable data are no longer available to the controller, i.e., data which could be used to maintain the electronic braking force distribution function. This applies in particular to defects in the speed sensors and specifically to cases in which it is no longer possible to detect speed values anywhere on an entire axle.

In a preferred exemplary embodiment, the emergency operating function described above is located in a component separate from the microcomputer itself. In this way, the emergency operating function can still be activated even if the microcomputer fails. In another advantageous exemplary embodiment, the emergency operating function is incorporated into the microcomputer. When the computer fails, the emergency operating function can no longer be activated either. In this advantageous exemplary embodiment, the driver is informed of this condition by the actuation of an additional warning lamp.

It is possible for the valves and the return pump to suffer from thermal overload when, for example, the driver actuates the brake pedal for an above-average length of time, or when a braking command has been detected in error. In a preferred exemplary embodiment, therefore, to protect these components from thermal overload during prolonged braking commands or in cases of erroneous brake command detection, the actuation time of the pulse series is limited in time. A prolonged braking command can be present only during slow travel or while the vehicle is not moving at all, which means that no vehicle stability problems exist. At the end of the predetermined time, the pressure is increased to the level of the primary pressure by a series of buildup pulses upon termination of the alternating actuation of the inlet and outlet valves. This brings the pressure level at the rear axle brakes slowly up to the primary pressure level. As a result, a gentle transition is achieved, and any sudden change in the braking behavior of the vehicle which might occur during slow travel is avoided.

The method for emergency operation according to the invention can be applied not only in conjunction with the known braking force distribution function described above but also with other strategies for braking pressure distribution between the front and rear axles.

In addition, the method according to the invention is used in an advantageous exemplary embodiment not only for emergency operation but also in general as a braking force distribution function under normal operating conditions.

The method is not limited to a hydraulic brake system with inlet and outlet valves, return pump, and reservoir. On the contrary, the method is realized by an alternating buildup and release of pressure at the rear axle brakes, by means of which an average saturation pressure below the primary pressure specified by the driver is reached. This can also be implemented with other hydraulic solutions, such as by the use of 3/2-valves, or with pneumatic brake systems.

Figure 4:
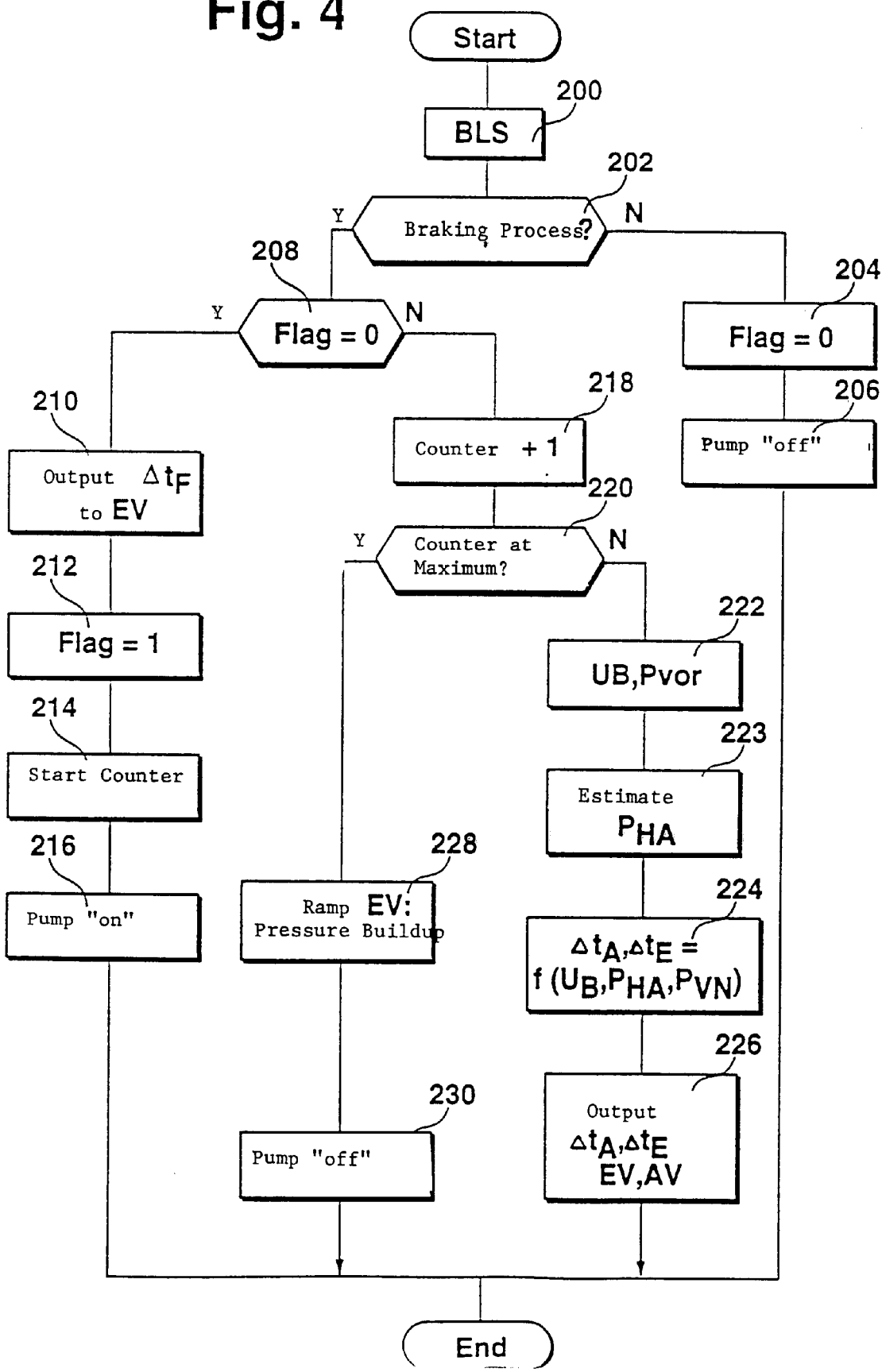
FIG. 4, finally, shows a flow diagram, which gives information on a realization of the method according to the invention in the form of computer program.

FIG. 4 shows a flow chart, which provides information on a realization of the method according to the invention as a computer program.

In the preferred exemplary embodiment, the subprogram shown in FIG. 4 is initiated upon recognition of a critical defect. In other exemplary embodiments, the subprogram is started at predetermined times during a braking process.

As soon as the subprogram starts, the signal status of the brake pedal switch BLS is accepted as input in the first step 200. Then the program checks in step 202 to see whether or not a braking process is present. If this is not the case, a flag is set to the value 0 in step 204, and in the following step 206 the return pump is turned off. Then the subprogram ends and is run again when needed.

If it has been found in step 202 that braking is in progress, the flag is then checked in the following step 208 to determine if it has the value 0. If this is the case, this indicates the beginning of a braking process. Therefore, the filling pulse ΔtF is transmitted in step 210 to the inlet valve or valves, i.e., the pressure is allowed to increase in the rear wheel brakes for time $\Delta t_F$. Then, in step 212, the flag is set to a value of 1, and in the next step 214 a counter is started.

In step 216, the pump is turned on. Then the subprogram ends and is run again when needed.

If it has been found in step 208 that the flag does not have a value of 0, this means that a braking process has not been recognized for the first time; the counter is thus advanced by a value of 1 in step 218. Then in question step 220 the program checks to see whether or not the counter has reached its maximum value. If it has not, the vehicle voltage UB and the primary pressure $p_{vor}$ are, in the preferred exemplary embodiment, accepted as input in step 222. In step 223, the current rear wheel brake pressure is estimated on the basis of the primary pressure $P_{vor}$ and the pressure buildup and release pulses which have already occurred. In step 224, the actuation times $\Delta t_E$ for the pressure buildup and $\Delta t_A$ for the pressure release are read out from a predetermined characteristic diagram on the basis of the detected parameters. In the next step 226, the inlet valves and outlet valves are actuated at predetermined times by the calculated pulses. Then the subprogram ends and is run again when needed.

If the counter has reached it maximum value in step 220, a ramp-like pressure buildup is initiated in the rear wheel brakes in step 228, and the pump is turned off in step 230. Then the subprogram ends.

The timing of the actuations initiated by the subprogram shown in FIG. 4 is such that, with each run-through of the program, one pressure buildup pulse and one pressure-release pulse can be transmitted.

What is claimed is:

1. Method for controlling a vehicle brake system having front and rear wheel brakes actuated by a driver, and valves for increasing and decreasing a brake pressure at that rear wheel brake, said method comprising:

determining whether a braking process has been initiated by the driver;

determining pulses with predetermined pressure build up times and pressure release times, when a braking process has been initiated by the driver; and outputting said pulses to the valves for increasing and decreasing brake pressure at said rear wheels in an alternating manner, whereby the pressure in said rear wheel brakes is alternately built up and released causing the brake pressure in the rear wheel actually reached to be, on average, below the primary pressure specified by the driver.

2. Method according to claim 1, characterized in that the alternating buildup and release of pressure at the rear wheel brakes is achieved by the alternating actuation of inlet and outlet valves.

3. Method according to claim 1, characterized in that the pressure is built up and released by predetermined pressure buildup and release pulses.

4. Method according to claim 3, characterized in that the duration of the pressure buildup and pressure release pulses is as a function of at least one of the parameters electrical system voltage, primary pressure, and rear wheel brake pressure.

5. Method according to claim 1, characterized in that a predetermined pressure buildup pulse is transmitted at the start of the braking process.

6. Method according to claim 1, characterized in that a return pump is operated during the braking process.

7. Method according to claim 1, characterized in that the pulse durations of the pressure buildup and release pulses are determined in such a way that, up to a primary pressure $P_{vor1}$ specified by the driver, the critical brake pressure in the rear wheel brakes at which, for a given adhesion coefficient, the rear wheels tend to lock, is not exceeded.

8. Method according to claim 1, characterized in that the alternating buildup and release of pressure is limited in time.

9. Method according to claim 1, characterized in that, upon expiration of a maximum predetermined length of time, a series of pressure buildup pulses-is transmitted, which brings the rear wheel brake pressure up to the primary pressure specified by the driver in a ramp-like manner.

10. Method according to claim 1, characterized in that the alternating buildup and release of pressure at the rear wheel brakes is implemented after the failure of an electronic braking force distribution controller, in defect situations in which information essential to the process of braking force distribution control is lacking to the controller.

11. Apparatus for controlling a brake system having front and rear wheel brakes actuated by a drive, and valves for increasing and decreasing a brake pressure at that rear wheel brake, said apparatus comprising:

means for determining whether a braking process has been initiated by the driver;

means for determining pulses with predetermined pressure build up times and pressure release times, when a braking process has been initiated by the driver; and means for outputting said pulses to the valves for increasing and decreasing brake pressure at said rear wheels in an alternating manner, whereby the pressure in said rear wheel brakes is alternately built up and released causing the brake pressure in the rear wheel actually reached to be, on average, below the primary pressure specified by the driver.

12. Apparatus according to claim 11, characterized in that the control unit comprises at least a first element for controlling the brake system and a second element for building up and releasing the pressure alternately.

13. Method for controlling a vehicle brake system having front and rear wheel brakes actuated by a driver, and valves for increasing and decreasing a brake pressure at that rear wheel brake, said method comprising:

determining whether a braking process has been initiated by the driver;

determining pulses to buildup and to release pressure in the rear wheel brake; and outputting said pulses in an alternating manner so that pressure in said rear wheel brake is alternately built up and released, whereby the pressure in said rear wheel brake remains below the pressure specified by the driver, wherein the alternating buildup and release of pressure at the rear wheel brakes is implemented after the failure of an electronic branding force distribution controller.

* * * * *